(12) United States Patent
Shin et al.

(10) Patent No.: US 12,159,459 B2
(45) Date of Patent: Dec. 3, 2024

(54) METHOD AND APPARATUS FOR EXTRACTING A FINGERPRINT OF A VIDEO HAVING A PLURALITY OF FRAMES

(71) Applicant: NAVER CORPORATION, Seongnam-si (KR)

(72) Inventors: Seong Hyeon Shin, Seongnam-si (KR); Jisu Jeon, Seongnam-si (KR); Dae Hwang Kim, Seongnam-si (KR); Jongeun Park, Seongnam-si (KR); Seung-bin Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 309 days.

(21) Appl. No.: 17/820,354

(22) Filed: Aug. 17, 2022

(65) Prior Publication Data
US 2023/0059559 A1 Feb. 23, 2023

(30) Foreign Application Priority Data

Aug. 18, 2021 (KR) .......................... 10-2021-0109090

(51) Int. Cl.
*G06V 20/40* (2022.01)
*G06V 10/42* (2022.01)
*G06V 10/62* (2022.01)
*G06V 20/00* (2022.01)

(52) U.S. Cl.
CPC ............ *G06V 20/46* (2022.01); *G06V 10/431* (2022.01); *G06V 10/62* (2022.01); *G06V 20/48* (2022.01); *G06V 20/95* (2022.01); *G06T 2207/20052* (2013.01)

(58) Field of Classification Search
CPC ........ G06V 20/46; G06V 20/48; G06V 20/95; G06V 10/431; G06V 10/62; G06T 2207/20052
See application file for complete search history.

(56) References Cited

U.S. PATENT DOCUMENTS 8,340,343 B2 * 12/2012 Anderson ............. G06T 1/0085
382/250

FOREIGN PATENT DOCUMENTS

KR      1020050108515 A      11/2005

OTHER PUBLICATIONS

Kang Hyeon Rhee; "Multimedia Fingerprinting in DCT Block"; Journal of IKEEE, vol. 15, No. 3; pp. 51-57; Sep. 2011.

* cited by examiner

*Primary Examiner* — Casey L Kretzer
(74) *Attorney, Agent, or Firm* — Greer Burns & Crain Ltd.

(57) ABSTRACT

A method for extracting a fingerprint of a video includes calculating 2D discrete cosine transform (DCT) coefficients from each of the plurality of frames of the video, extracting, from the 2D DCT coefficients, a coefficient having a basis satisfying at least one of up-down symmetry or left-right symmetry, and calculating a fingerprint of the video based on the extracted coefficient.

19 Claims, 8 Drawing Sheets

510

910

920

METHOD AND APPARATUS FOR EXTRACTING A FINGERPRINT OF A VIDEO HAVING A PLURALITY OF FRAMES

CROSS-REFERENCE TO RELATED APPLICATION

This application claims priority to Korean Patent Application No. 10-2021-0109090, filed in the Korean Intellectual Property Office on Aug. 18, 2021, the entire contents of which are hereby incorporated by reference.

BACKGROUND OF THE INVENTION

Field of Invention

The present disclosure relates to a method and an apparatus for extracting a fingerprint of a video having a plurality of frames, and specifically, to a method and an apparatus for extracting a fingerprint of a video by calculating a discrete cosine transform (DCT) coefficient from a video, and extracting a coefficient having a symmetric basis from the calculated DCT coefficients.

Description of Related Art

Recently, consumption of video content has greatly increased and various video platforms have appeared, creating an environment in which users can easily and conveniently create, share, and watch video content. In this environment, as increasing number of video contents are produced and distributed by various users, unauthorized copies and distributions of videos have also increased, along with the need for copyright protection for videos.

Various content verification methods may be used to track illegal distributors or possible illegal distribution of video content shared or sold on video platforms. For example, for a video verification system that utilizes fingerprinting or video fingerprinting, a watermark-based fingerprinting method that inserts owner information, and the like in the content, or a fingerprinting method based on feature points extracted from the content may be used. According to the feature point-based fingerprint method, it is possible to extract the feature points such as frequency components, screen change information, location information, and the like from the content such as music and video, store them in a database, and compare them with the feature points extracted from another content to determine whether or not the two contents are the same or similar to each other.

By using such a video content verification method, if an illegal distributor identically copies and distributes the original video, it is possible to easily identify the sameness or similarity of the original video and the duplicate video. However, unauthorized distributors exploit the characteristics of this video content verification method to copy the original video and apply various alterations to the copied video to invalidate the existing verification method. For example, if an illegal distributor copies the original video, and flips the copied video left and right or up and down and distributes it, there is a problem that existing video fingerprint extraction methods cannot easily identify the illegal distribution of the video with these alterations.

BRIEF SUMMARY OF THE INVENTION

In order to address one or more problems (e.g., the problems described above and/or other problems not explicitly described herein), the present disclosure provides a method for, a non-transitory computer-readable recording medium storing instructions for, and an apparatus (system) for extracting a fingerprint of a video including a plurality of frames.

The present invention may be implemented in a variety of ways, including a method, an apparatus (system), or a non-transitory computer-readable recording medium storing instructions.

A method for extracting a fingerprint of a video including a plurality of frames is provided, which may be executed by one or more processors and include calculating a 2D discrete cosine transform (DCT) coefficient from each of the plurality of frames, extracting, from the 2D DCT coefficients, a coefficient having a basis satisfying at least one of up-down symmetry or left-right symmetry, and calculating a fingerprint of the video based on the extracted coefficient.

There is provided a non-transitory computer-readable recording medium storing instructions for executing the method on a computer.

A computing device is provided, which may include a memory; and one or more processors connected to the memory and configured to execute one or more computer-readable programs included in the memory, in which the one or more programs may include instructions for calculating 2D DCT coefficients from each of a plurality of frames included in a video, extracting, from the 2D DCT coefficients, a coefficient having a basis satisfying at least one of up-down symmetry or left-right symmetry, and calculating a fingerprint of the video based on the extracted coefficient.

According to some examples of the present disclosure, by calculating the fingerprint of the video only with DCT coefficients having a basis satisfying at least one of up-down symmetry or left-right symmetry, it is possible to effectively identify the video that is flipped left and right or upside down and identify whether or not the video is a tampered video, which could not be easily identified by conventional methods.

According to some examples of the present disclosure, by selecting only the low-band coefficients from the DCT coefficients, even if detailed alterations are applied to the video, it is possible to easily identify whether or not tampering is present and also identify a video applied with the noise.

According to some examples of the present disclosure, even if the DCT coefficient is partially changed due to alterations made to the video, since the varying pattern of the DCT coefficients can remain generally similar, it is possible to effectively identify the tampered video by calculating the mean of variances of the DCT coefficients.

According to some examples of the present disclosure, by excluding the coefficient of the DC component, it is also possible to effectively identify the tampered video having certain alterations applied to the entire video.

The effects of the present disclosure are not limited to the effects described above, and other effects not described herein can be clearly understood by those of ordinary skill in the art from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION OF THE INVENTION

Figure 1:
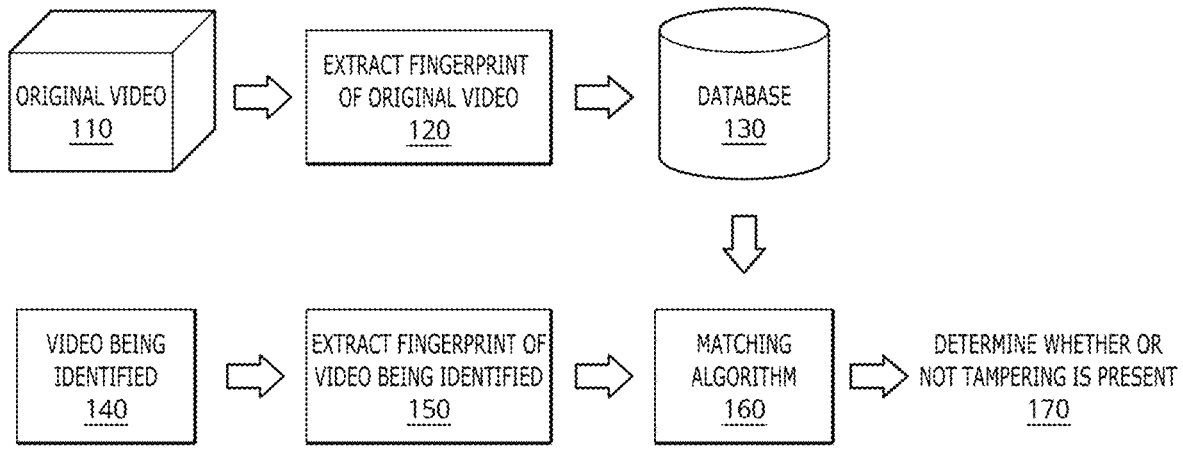
FIG. 1 is a diagram illustrating an example of a method of a computing device for identifying whether or not a video is a tampered video.

Hereinafter, examples for the practice of the present invention will be described in detail with reference to the accompanying drawings. However, in the following description, detailed descriptions of well-known functions or configurations will be omitted if they make the subject matter of the present disclosure unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components be excluded from the invention.

Advantages and features of the disclosed examples and methods of accomplishing the same will be apparent by referring to examples described below in connection with the accompanying drawings. However, the present invention is not limited to the examples disclosed below, and may be implemented in various forms different from each other, and the examples are merely provided to make the present invention complete, and to fully disclose the scope of the invention to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary. In the present disclosure, "each of a plurality of A" may refer to each of all components included in the plurality of A, or may refer to each of some of the components included in a plurality of A.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, "frames" may include still images forming a video or a video. As an example, the "frame" may be referred to as an "image". In addition, the image or the video may include frames including a plurality of still images obtained by capturing an image of a subject or the like at regular time intervals.

In the present disclosure, a "discrete cosine transform (DCT)" may refer to an operation or calculation of transforming an image or a frame into a sum of cosine functions of various frequencies. In a DCT, cosine functions of various frequencies may serve as a basis, and DCT coefficients may refer to weights applied to each basis function. In the case of a 2D DCT, a plurality of basis and/or a plurality of DCT coefficients may be expressed as a 2D matrix. As an example, performing the discrete cosine transform may include calculating DCT coefficients from the image or the frame.

FIG. 1 is a diagram illustrating an example of a method of a computing device for identifying whether or not a video is a tampered video. The computing device may obtain a fingerprint of an original video 110. The fingerprint of the original video 110 may refer to the fingerprint of the original video that is extracted by the computing device 120 from the original video 110 and stored in the database 130 as illustrated, or may be the fingerprint received from an external system. The fingerprint of the original video 110 may be extracted according to according to various examples.

In the present disclosure, "fingerprint of a video" may refer to a key feature from the video or may be a means for identifying a same/similar video or a transformed video. A fingerprint of a video that is the same as or similar to the original video or a video transformed from the original may have the same/similar characteristics as the fingerprint of the original video. According to an embodiment, a matching algorithm may determine whether a video is a transformed video (including the same video as the original video) from the original video by comparing the fingerprint of the transformed video being identified with the fingerprint of the original video.

The computing device may extract 150 a fingerprint of a video being identified. The fingerprint of the video 140 being identified may be extracted according to methods for extracting a fingerprint of a video according to various examples, or may be extracted according to the same or similar method as the method that is employed to extract the fingerprint of the original video 120.

The computing device may determine 170 whether or not the video being identified is a tampered video, by comparing the obtained fingerprint of the original video 110 with the extracted fingerprint of the video 140 being identified. That is, the computing device may determine whether or not the video being identified is tampered video of the original video. In this case, the tampering may include applying certain alterations to the original video, such as adding noise to the original video (e.g., Gaussian noise), lowering the quality of the original video, blurring the original video (e.g., Gaussian blur), rotating the original video (e.g., rotate), deleting a part or some frames of the original video (e.g., crop or drop), adjusting the brightness of the original video, applying gamma to the original video (e.g., gamma correction), enlarging, reducing or moving the original video and inserting a meaningless background (e.g., zoom and shift), inverting the original video left and right or up and down (e.g., flip), and the like. A video 140 being identified that is identical to the original video 110 may be determined to be the tampered video of the original video.

The computing device may input the fingerprint of the original video 110 and the fingerprint of the video 140 being identified to a matching algorithm 160 to determine 170 whether or not tampering is present. If at least a portion of the fingerprint of the video being identified is the same as, similar to, or within an error range of at least a portion of the fingerprint of the original video 110, the matching algorithm 160 may determine that the video 104 being identified is the tampered video of the original video. For example, if the fingerprint of the original video is [a, b, c, d, e, f, g, h] and the fingerprint of the video being identified is [c, d, e, f, g], the fingerprint of the video being identified is the same as a portion of the fingerprint of the original video (from the 3rd to 7th components of the fingerprint of the original video), and accordingly, the matching algorithm 160 may determine that the video being identified is the tampered video of the original video.

With such a configuration, it is possible to identify a tampered video that is altered from an original video to avoid copyright infringement, and strengthen the copyright protection of the video.

Figure 2:
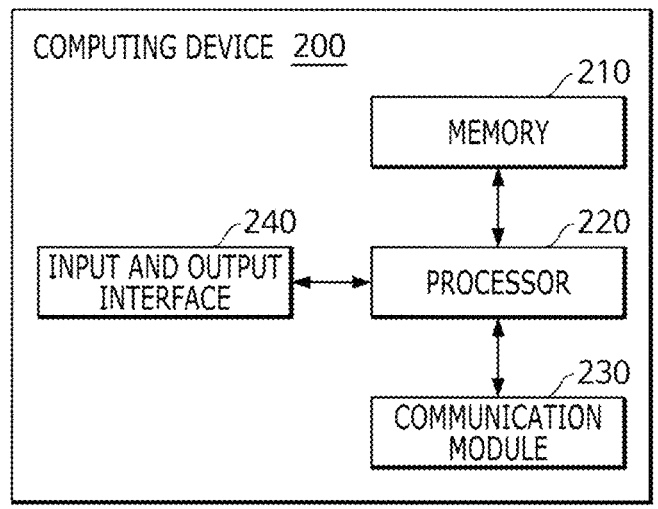
FIG. 2 is a block diagram of an internal configuration of the computing device.

FIG. 2 is a block diagram of an internal configuration of a computing device 200. The computing device 200 may include a memory 210, a processor 220, a communication module 230, and an input and output interface 240. The computing device 200 may be configured to communicate information and/or data through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and the like may be included in the computing device 200 as a separate permanent storage device that is separate from the memory. In addition, an operating system and at least one program code (e.g., a code for extracting a fingerprint of a video, identifying whether or not a video is a tampered video, and the like installed and driven in the computing device 200) may be stored in the memory 210.

These software components may be loaded from a computer-readable recording medium separate from the memory 210. Such a separate computer-readable recording medium may include a recording medium directly connectable to the computing device 200, and may include a computer-readable recording medium such as a floppy drive, a disk, a tape, a DVD/CD-ROM drive, a memory card, and the like, for example. In another example, the software components may be loaded into the memory 210 through the communication module 230 rather than the computer-readable recording medium. For example, at least one program may be loaded into the memory 210 based on a computer program (e.g., a program or the like for extracting a fingerprint of a video, identifying whether or not a video is a tampered video, and the like) installed by the files provided by the developers, or by a file distribution system that distributes an installation file of an application through the communication module 230.

The processor 220 may be configured to process the commands of the computer program by performing basic arithmetic, logic, and input and output operations. The commands may be provided to a user terminal (not illustrated) or another external system by the memory 210 or the communication module 230. For example, the processor 220 may calculate a 2D DCT coefficient from each of a plurality of frames included in the video, extract from the coefficients a coefficient that has basis satisfying at least one of up-down symmetry or left-right symmetry, and calculate a fingerprint of the video based on the extracted coefficient. In addition, the processor 220 may obtain a fingerprint of an original video, extract the fingerprint of a video being identified, and compare the fingerprint of the original video with the fingerprint of the video being identified to determine whether or not the video being identified is a tampered video.

The communication module 230 may provide a configuration or function for the user terminal (not illustrated) and the computing device 200 to communicate with each other through a network, and may provide a configuration or function for the computing device 200 to communicate with an external system (e.g., a separate cloud system). For example, control signals, commands, data, and the like provided under the control of the processor 220 of the computing device 200 may be transmitted to the user terminal and/or the external system through the communication module 230 and the network through the communication module of the user terminal and/or external system. For example, whether or not the video being identified, which is identified by the computing device, is the tampered video may be transmitted to an external system (e.g., a copyright management system, and the like).

In addition, the input and output interface 240 of the computing device 200 may serve as a means for interfacing with a device (not illustrated) which may be connected to or included in the computing device 200. In FIG. 2, the input and output interface 240 is illustrated as a component configured separately from the processor 220, but aspects are not limited thereto, and the input and output interface 240 may be configured to be included in the processor 220. The computing device 200 may include more components than those illustrated in FIG. 2. Meanwhile, known components may not necessarily require exact illustration.

The processor 220 of the computing device 200 may be configured to manage, process, and/or store the information and/or data received from a plurality of user terminals and/or a plurality of external systems. The processor 220 may receive a video including a plurality of frames from a user terminal and/or an external system. In this case, the processor may calculate a 2D DCT coefficient from each of a plurality of frames included in the received video, extract from the 2D DCT coefficients a coefficient that has basis satisfying at least one of up-down symmetry or left-right symmetry, and calculate a fingerprint of the video based on the extracted coefficient.

Figure 3:
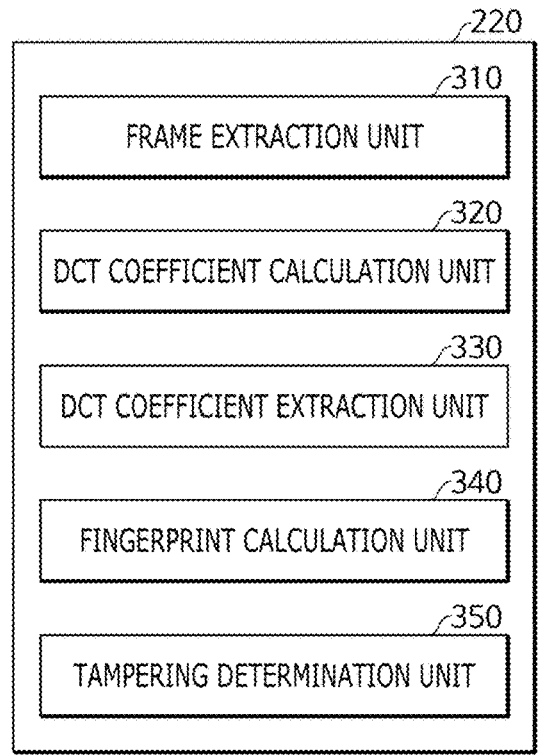
FIG. 3 is a block diagram of an internal configuration of a processor.

FIG. 3 is a block diagram of an internal configuration of the processor 220. As illustrated, the processor 220 may include a frame extraction unit 310, a DCT coefficient calculation unit 320, a DCT coefficient extraction unit 330, a fingerprint calculation unit 340, and a tampering determination unit 350. The frame extraction unit 310 may extract a plurality of frames from a video. For example, if a video is n seconds in length, with a plurality of frames being generated at predefined time interval, that is, every 1/30 seconds, then the still images (frames) of the video corresponding to 0/30 seconds, 1/30 seconds, 2/30 seconds, 3/30 seconds, and n/30 seconds may be extracted. In another example, if the video is compressed by a specific encoding algorithm, the frame extraction unit 310 may apply a decoding algorithm to the video to extract the frames included in the corresponding video.

The DCT coefficient calculation unit 320 may calculate a 2D DCT coefficient from each of the plurality of frames. The DCT coefficient calculation unit 320 may obtain a plurality of pixel value matrices from each of a plurality of frames, and perform a 2D discrete cosine transform on each of the plurality of pixel value matrices to calculate a 2D DCT coefficient. Then, the DCT coefficient calculation unit 320 may select, from the calculated 2D DCT coefficients, a plurality of low-band coefficients having a basis frequency equal to or less than a predefined frequency. Since the 2D DCT basis may include a cosine basis function in the horizontal direction and a cosine basis function in the vertical direction, the "predefined frequency" that is the reference of the low band may include at least one of a reference of a horizontal frequency and a reference of a vertical frequency. The process of selecting a low-band coefficient from the DCT coefficients may be performed by the DCT coefficient extraction unit 330. An example of a process in which the DCT coefficient calculation unit 320 calculates the 2D DCT coefficient will be described in detail below with reference to FIG. 4.

The DCT coefficient extraction unit 330 may extract from the 2D DCT coefficients a coefficient having a basis satisfying at least one of up-down symmetry or left-right symmetry. The DCT coefficient extraction unit 330 may extract from the low-band coefficients a plurality of coefficients having a basis satisfying at least one of up-down symmetry or left-right symmetry. If a fingerprint is calculated based on the coefficient having a basis satisfying up-down symmetry or left-right symmetry, since a similar fingerprint of the video can be extracted even if the video is left-right or up-down inverted, the DCT coefficient extraction unit 330 may extract a coefficient having a basis satisfying at least one of left-right symmetry or up-down symmetry. In this case, the coefficient of the DC component may be excluded. The DC component may include coefficients in which both the horizontal frequency and the vertical frequency of the basis are 0. An example of a process in which the coefficient extraction unit 330 extracts from the 2D DCT coefficients a coefficient having a basis satisfying at least one of up-down symmetry or left-right symmetry will be described below in detail with reference to FIGS. 5 to 7.

The fingerprint calculation unit 340 may calculate a fingerprint of the video based on the coefficients extracted by the DCT coefficient extraction unit 330. The fingerprint calculation unit 340 may calculate, from the extracted coefficients, a mean of coefficient variances according to temporal change in a plurality of frames. For example, the fingerprint calculation unit 340 may calculate the variances between adjacent coefficients having the same basis among the coefficients, and calculate the mean of calculated variances for each basis. The mean of calculated variances for each basis may be used as a fingerprint of the video. An example of a process in which the fingerprint calculation unit 340 calculates a fingerprint of a video will be described below in detail with reference to FIG. 8.

The tampering determination unit 350 may determine whether or not the video being identified is a tampered video, by comparing the fingerprint of the original video with the fingerprint of the video being identified. The tampering determination unit 350 may input the fingerprint of the original video and the fingerprint of the video being identified into a matching algorithm to determine whether or not tampering is present. If at least a portion of the fingerprint of the video being identified is the same as, similar to, or within an error range of at least a portion of the fingerprint of the original video, the matching algorithm may determine that the video being identified is the tampered video of the original video.

The internal configuration of the processor 220 illustrated in FIG. 3 is only an example, and in some examples, configurations other than the illustrated internal configuration may be additionally included, or some configurations may be omitted, or some processes may be performed by other configurations or external systems. For example, if the frame extraction unit 310 is omitted, a plurality of frames may be received from an external system. As another example, if the tampering determination unit 350 is omitted, the processor 220 may only perform the process of extracting a fingerprint of the video, and whether or not tampering is present may be determined at the external system. In addition, although the internal components of the processor 220 have been described separately for each function in FIG. 3, it does not necessarily mean that they are physically separated.

Figure 4:
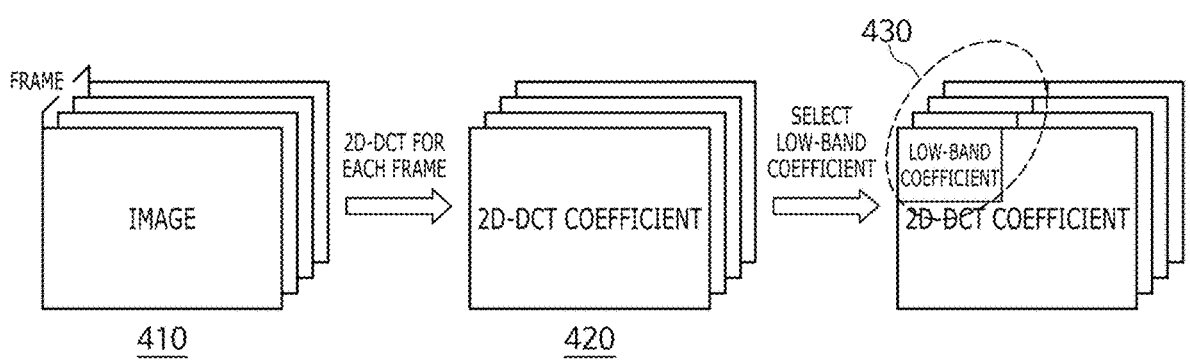
FIG. 4 is a diagram illustrating an example of a method for calculating a 2D discrete cosine transform coefficient from each of a plurality of frames and selecting a low-band coefficient.

FIG. 4 is a diagram illustrating an example of a method for calculating a 2D discrete cosine transform coefficient 420 from each of a plurality of frames 410 and selecting a low-band coefficient 430. The computing device 200 may perform 2D discrete cosine transform on each of the plurality of frames 410 included in the video to calculate the 2D DCT coefficients 420. For example, each of the plurality of frames 410 may be expressed as a 2D pixel value matrix. A 2D DCT coefficient matrix 420 may be calculated by performing a 2D discrete cosine transform on each of the plurality of 2D pixel value matrices. Since a DCT is performed on each of the plurality of frames (or a plurality of pixel value matrices) 410, the 2D DCT coefficient matrix 420 may be calculated as many as the number of frames 410. In addition, the size of the 2D DCT matrix may be the same as the size (that is, resolution of the video) of the 2D pixel value matrix. For example, if the resolution (height×width) of the video is 144×176 and the number of frames is 100,000, then 100,000 of 144×176 2D DCT coefficient matrices may be calculated.

The basis of the 2D DCT may include a horizontal frequency and a vertical frequency. In the 2D DCT coefficient matrix 420, the horizontal frequency of the basis of the leftmost column coefficient may be 0, and the horizontal frequency of the basis may increase toward the right. In addition, in the 2D DCT coefficient matrix 420, the vertical frequency of the basis of the uppermost row coefficient may be 0, and the vertical frequency of the basis may increase toward the bottom. That is, in the 2D DCT coefficient matrix 420, as the horizontal index increases, it may be a coefficient of a basis having a larger horizontal frequency, and as the vertical index increases, it may be a coefficient of a basis having a larger vertical frequency.

The computing device 200 may select the low-band coefficient 430 from the calculated 2D DCT coefficients 420. If a DCT is performed, most of the visually important information on the image (e.g., contours and varying patterns of the objects included in the image) may be concentrated in the low-band portion. Accordingly, by selecting only the low-band coefficients 430 of the DCT coefficients 420, the computing device 200 may extract a fingerprint that can respond to various types of tampering by identifying whether or not an original video is copied. The low-band condition for selecting the low-band coefficient 430 may include a horizontal frequency condition and a vertical frequency condition. For example, the computing device 200 may select, as the low-band coefficient 430, a coefficient of the 2D DCT coefficients 420 that has a horizontal frequency equal to or less than a first predefined frequency, and a coefficient of the 2D DCT coefficients 420 that has a vertical frequency equal to or less than a second predefined frequency. The low-band condition for selecting the low-band coefficient 430 may be determined based on the resolution of the video. For example, the computing device 200 may determine an index of a predetermined ratio or less based on the resolution of the video to be the low band.

When selecting the low-band coefficient 430 from the 2D DCT coefficients 420, the computing device 200 may select the low-band coefficient according to the same low-band condition for all of the plurality of frames.

Figure 5:
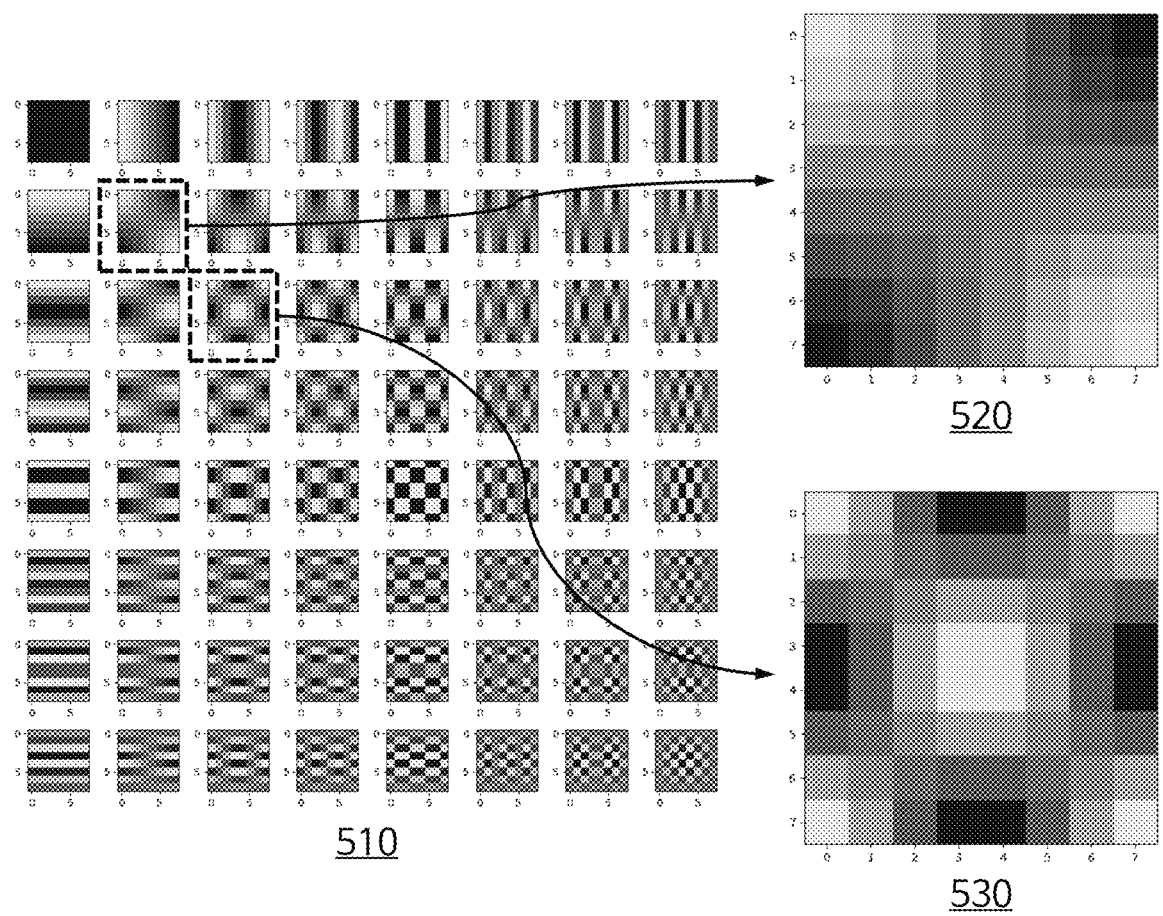
FIG. 5 is a diagram illustrating an example of a 2D DCT basis.

FIG. 5 is a diagram illustrating an example of a 2D DCT basis 510. The 2D DCT basis 510 may be expressed as a 2D matrix. FIG. 5 illustrates an example of 64 DCT bases 510 of an 8×8 matrix. The horizontal axis may represent a horizontal cosine wave basis, and the vertical axis may represent a vertical cosine wave basis. In addition, the horizontal frequency may start from 0 and increase toward the right, and the vertical frequency may start from 0 and increase toward the bottom.

The 2D DCT bases 510 may include a basis satisfying only left-right symmetry, a basis satisfying only up-down symmetry, a basis 530 satisfying both left-right symmetry and up-down symmetry, and a basis 520 satisfying neither of them. Whether or not the basis satisfies the left-right symmetry may be determined by the horizontal cosine wave, and whether or not the basis satisfies the up-down symmetry may be determined by the vertical cosine wave. That is, the bases in the same column may be all left-right symmetric or none of them may be left-right symmetric, and the bases in the same row may be all up-down symmetric or none of them may be up-down symmetric. In addition, whether or not the bases of the adjacent column are left-right symmetric may be different, and whether or not the bases of the adjacent row are up-down symmetrical may be different.

Figure 6:
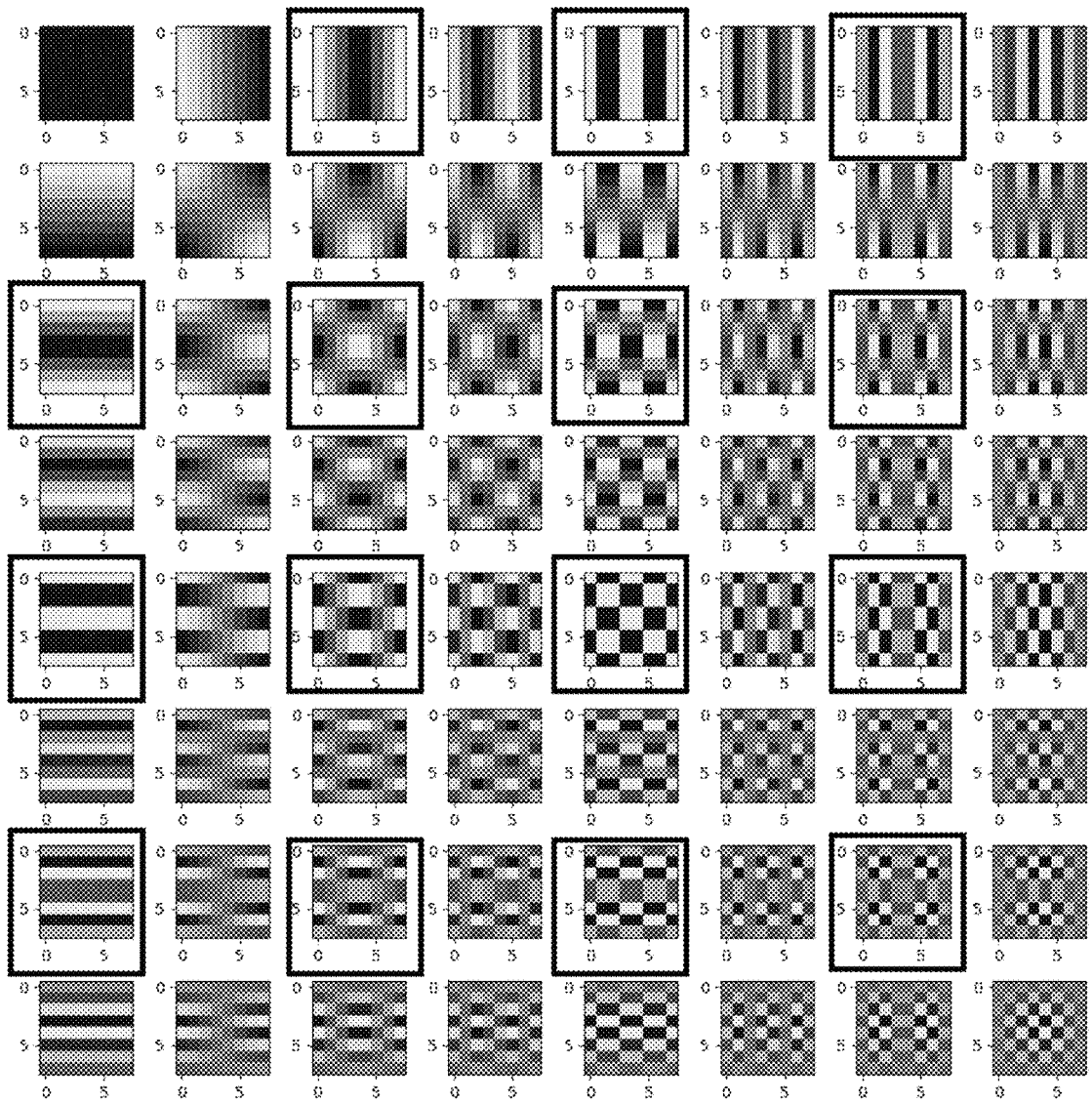
FIG. 6 is a diagram illustrating an example of a method for extracting some of the 2D DCT bases.

FIG. 6 is a diagram illustrating an example of a method for extracting some of the 2D DCT bases 510. The computing device 200 may extract a plurality of coefficients having a basis satisfying up-down symmetry from the calculated 2D DCT coefficients or the selected low-band coefficients. For example, the coefficients having the bases of the $1^{st}$ column, $3^{rd}$ column, $5^{th}$ column, and $7^{th}$ column may be extracted from the 2D DCT bases 510 shown. According to another example, the computing device 200 may extract a plurality of coefficients having a basis satisfying left-right symmetry from the calculated 2D DCT coefficients or the selected low-band coefficients. For example, the coefficients having the bases of the $1^{st}$ row, $3^{rd}$ row, $5^{th}$ row, and $7^{th}$ row may be extracted from the 2D DCT bases 510 shown. According to still another example, the computing device 200 may extract a plurality of coefficients having a basis satisfying both up-down symmetry and left-right symmetry from the calculated 2D DCT coefficients or the selected low-band coefficients. For example, as illustrated in FIG. 5, the coefficients having bases shown in boxes, which satisfy both up-down symmetry and left-right symmetry, may be extracted. If the coefficients of the 2D DCT coefficient matrix that have the basis satisfying both up-down symmetry and left-right symmetry are displayed, a checkered pattern may appear as illustrated.

In this way, by calculating a fingerprint only with the coefficients having a basis satisfying at least one of up-down symmetry or left-right symmetry, even if the video is flipped left and right or upside down, the extracted fingerprint of the video can be the same or similar to the fingerprint of the original video, and accordingly, it is possible to identify whether or not the video is tampered video.

A coefficient may be excluded, if it has both the horizontal frequency of the basis and the vertical frequency of the basis as 0 (e.g., the coefficient of the basis of $1^{st}$ row, $1^{st}$ column of the 2D DCT bases 510 of FIG. 5). The coefficient having both the horizontal and vertical frequencies of basis as 0 may be a coefficient of a DC component. If a certain change is applied to the image or the entire video (e.g., if the brightness of the entire video is adjusted), since this will only cause a change in the DC component, the coefficient of the DC component may be excluded when extracting the fingerprint of the video.

Figure 7:
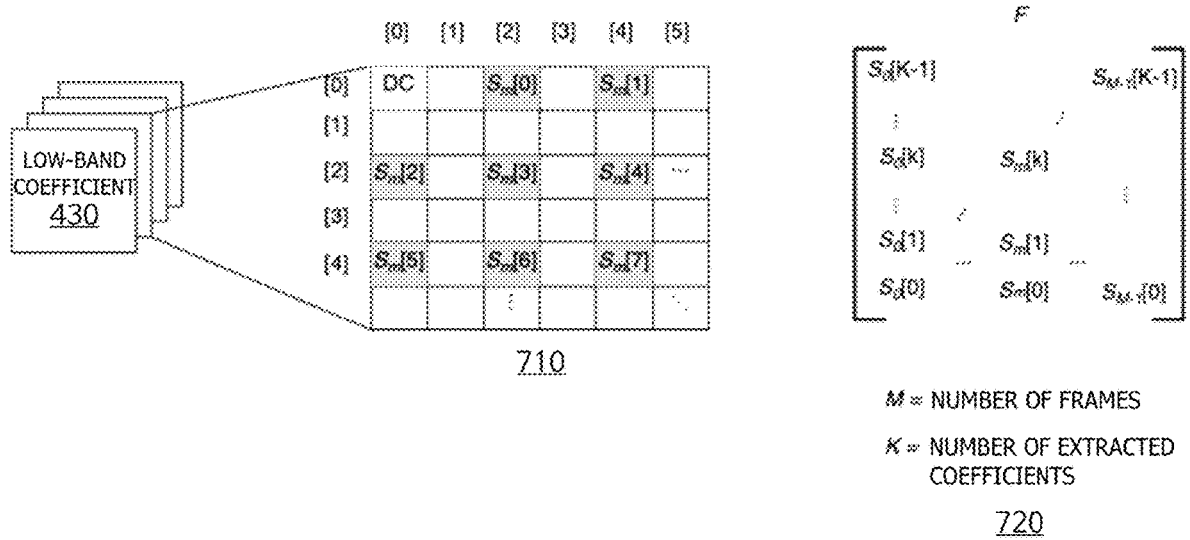
FIG. 7 shows diagrams illustrating an example of a method for extracting, from low-band coefficients, a coefficient having a basis satisfying at least one of up-down symmetry or left-right symmetry.

FIG. 7 is a diagram illustrating an example of a method for extracting, from low-band coefficients, a coefficient having a basis satisfying at least one of up-down symmetry or left-right symmetry. The computing device 200 may extract at least some of coefficients having a basis satisfying at least one of up-down symmetry or left-right symmetry from the 2D DCT coefficients of the plurality of frames or from the low-band coefficients 430 of the plurality of frames. For example, as illustrated, all coefficients having a basis satisfying up-down symmetry and left-right symmetry may be extracted 710 from the low-band coefficients 430 of a plurality of frames. As described above, if all coefficients having a basis satisfying the up-down symmetry and left-right symmetry are extracted, the coefficients may be extracted in the form of a checkered pattern from the 2D DCT coefficient matrix. The coefficient of the DC component may be excluded.

The computing device 200 may extract the coefficients with the same basis for each of a plurality of frames. That is, coefficients of the same basis may be extracted from the low-band coefficients 430 of all frames.

The coefficients extracted from the low-band coefficients 430 of the plurality of frames may be expressed as a matrix (F) 720. For example, as illustrated, a matrix (F) 720 having a size of [number of extracted coefficients per frame× number of frames] may be expressed, where the horizontal axis represents the frames and the vertical axis represents the extracted coefficients. In the matrix (F) 720, one row may include coefficients having the same basis extracted from a plurality of frames, and one column may include coefficients having the same basis extracted from the same frame. As illustrated, if the index starts from 0, the component Sm [k] of the matrix 720 may represent the coefficient of the (k+1) th basis extracted from the (m+1) th frame.

Figure 8:
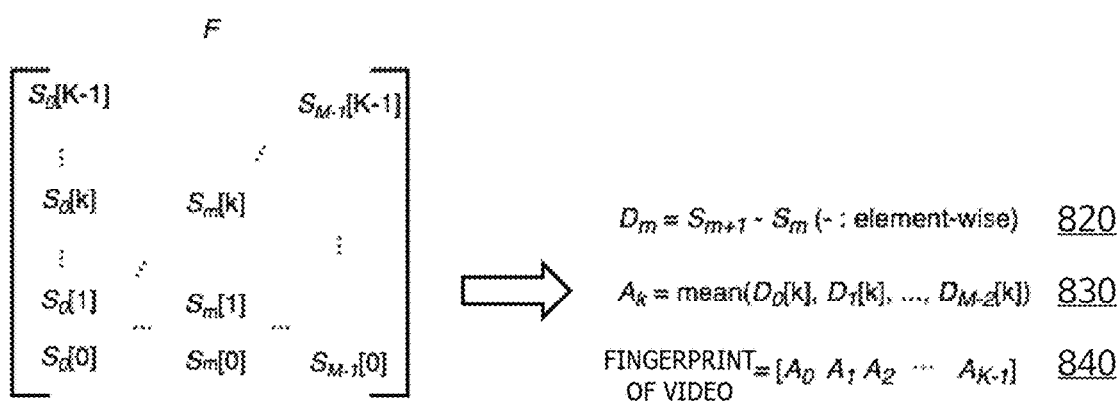
FIG. 8 is a diagram illustrating an example of a method for calculating a fingerprint of a video.

FIG. 8 is a diagram illustrating an example of a method for calculating a fingerprint 840 of a video. The computing device 200 may calculate the fingerprint of the video based on the extracted coefficients 720. The computing device 200 may calculate the fingerprint of the video by calculating, from the extracted coefficients 720, a mean of variances of the extracted coefficients according to temporal change in a plurality of frames.

Specifically, first, the computing device 200 may calculate the variance 820 of the extracted coefficients according to temporal change in the plurality of frames. For example, the variance 820 may be calculated by calculating a difference between adjacent frames of coefficients having the same basis among the extracted coefficients 720. As illustrated, if Sm [k] is a coefficient having the (k+1) th basis extracted from the (m+1) th frame, the variance 820 Dm [k] may be calculated as Sm+1 [k]−Sm [k]. If the total number of frames is M, (M−1) variances (D0[k], D1[k], . . . , DM-2 [k]) may be calculated between adjacent frames for each basis.

Then, the computing device 200 may calculate a mean 830 of the calculated variances 820 for each basis. For example, the mean Ak of variances of the coefficient of the (k+1) th basis according to temporal change may be calculated as a mean of variances from D0 [k] to DM-2 [k]. If the number of coefficients extracted for each frame is K, K number of means 830 (A0, A1, . . . , AK-1) for each basis may be calculated.

The computing device 200 may calculate the fingerprint 840 of the video by arranging the calculated means 830 of the variances of coefficients according to temporal change for each basis in order. The fingerprint 840 calculated as described above may be used to identify whether or not a video is tampered video.

Figure 9:
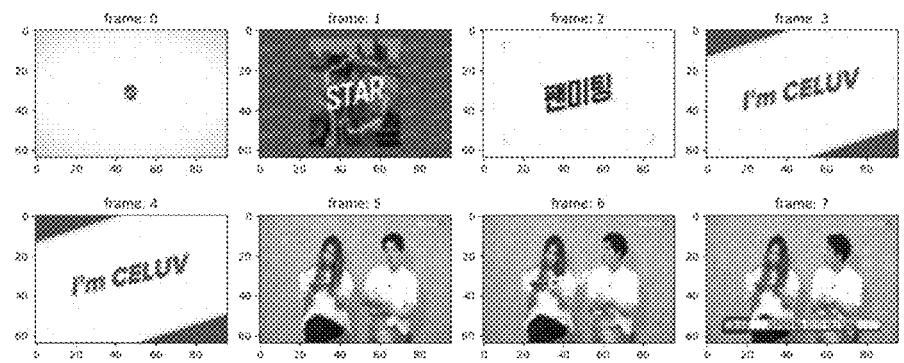
FIG. 9 shows diagrams illustrating examples of original videos and videos being identified.
Figure 9:
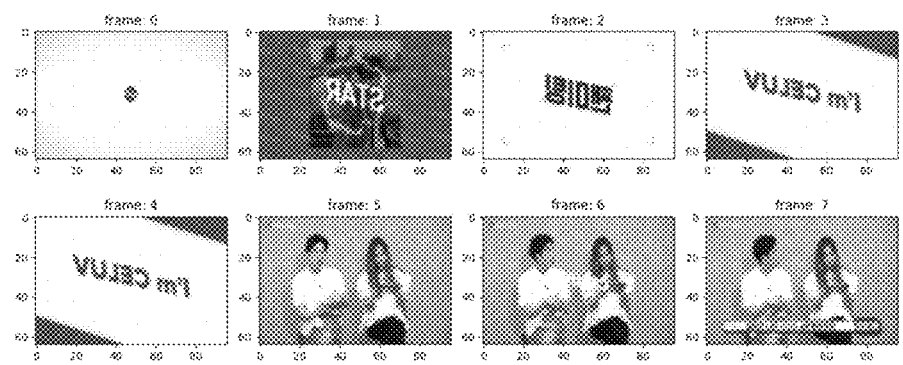

FIG. 9 is a diagram illustrating an example of original videos 910 and videos 920 being identified. In order to avoid copyright infringement, the videos 920 being identified may be altered in certain ways from the original videos 910. For example, the video being identified 920 may be obtained by adding noise to the original video 910 (e.g., Gaussian noise), lowering the quality of the original video, blurring the original video (e.g., Gaussian blur), rotating the original video (e.g., rotate), deleting a part or some frames of the original video (e.g., crop or drop), adjusting the brightness of the original video, applying gamma to the original video (e.g., gamma correction), enlarging, reducing, or moving the original video and inserting a meaningless background (e.g., zoom and shift), and inverting the original video left and right or up and down (e.g., flip).

Since most of the visually important information on an image is concentrated in the low-band coefficients of the DCT coefficients, by calculating the DCT coefficients from a plurality of the frames and extracting only the low-band coefficients and using these to calculate a fingerprint, it is possible to effectively identify whether or not the original video has been tampered. In addition, even if the DCT coefficient is changed due to alterations made to the video, if most of the visually important information on the video remains, the varying pattern of the DCT coefficients will be generally similar, and accordingly, it is possible to identify whether or not tampering is present. In particular, if the video 920 being identified is obtained by flipping the original video left and right or upside down, it is possible to more effectively identify whether or not tampering is present by extracting only the coefficients having a basis satisfying at least one of up-down symmetry or left-right symmetry among the low-band coefficients and calculating a fingerprint.

Figure 10:
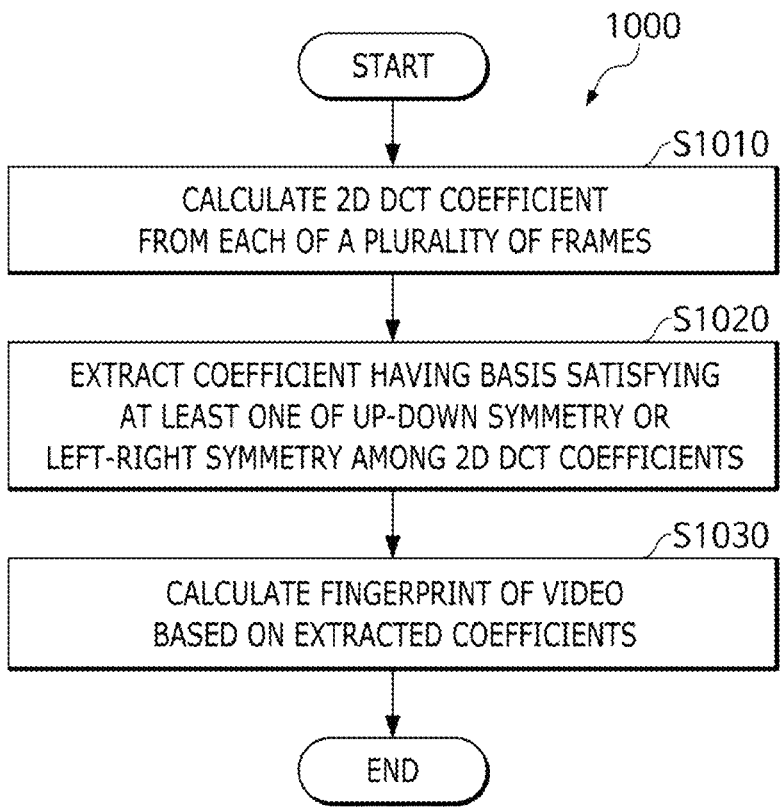
FIG. 10 is a flowchart illustrating an example of a method for extracting a fingerprint of a video.

FIG. 10 is a flowchart illustrating an example of a method 1000 for extracting a fingerprint of a video. Each operation of the method 1000 may be performed by one or more processors. The method 1000 may be initiated by the processor 220 calculating 2D DCT coefficients from each of a plurality of frames included in a video, at S1010. For example, the processor 220 may obtain a plurality of pixel value matrices from each of the plurality of frames, and calculate 2D DCT coefficients from each of the plurality of pixel value matrices.

Then, the processor 220 may extract the coefficients having a basis satisfying at least one of up-down symmetry or left-right symmetry among the 2D DCT coefficients, at S1020. The processor 220 may select low-band coefficients from the 2D DCT coefficients, and extract from the low-band coefficients a plurality of coefficients having a basis satisfying at least one of up-down symmetry or left-right symmetry. In this case, the low-band coefficient may be a coefficient having the horizontal frequency of the basis equal to or less than a first predefined frequency and the vertical frequency of the basis equal to or less than a second predefined frequency. In addition, a coefficient (coefficient of a DC component) having both the horizontal and vertical frequencies of the basis as 0 may be excluded. The process of selecting the low-band coefficients and/or the process of excluding the coefficient of the DC component may be performed at S1010.

The processor 220 may calculate the fingerprint of the video based on the extracted coefficients, at S1030. The processor 220 may calculate, from the extracted coefficients, a mean of variances of the extracted coefficients according to temporal change in a plurality of frames to calculate the fingerprint of the video. For example, the processor 220 may calculate the variances between adjacent frames of the coefficients having the same basis among the extracted coefficients and calculate a mean of the calculated variances for each basis to thus calculate the fingerprint of the video. The fingerprint of the video extracted as described above may be used to identify whether or not the video is a tampered video.

Figure 11:
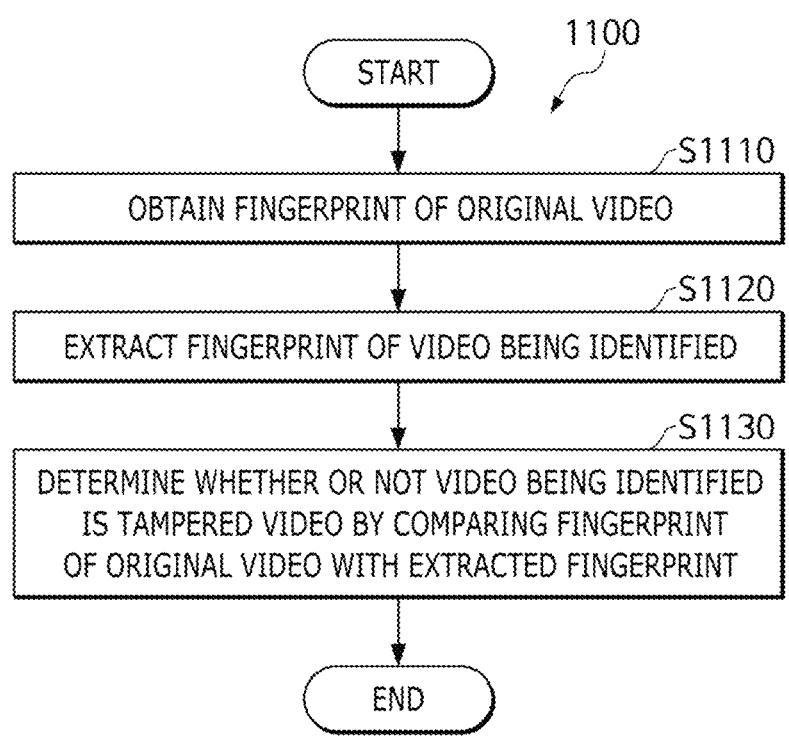
FIG. 11 is a flowchart illustrating an example of a method for identifying whether or not a video is a tampered video.

FIG. 11 is a flowchart illustrating an example of a method 1100 for identifying whether or not a video is a tampered video. The processor 220 may obtain a fingerprint of the original video, at S1110. For example, the fingerprint of the original video stored in the database may be received, or the processor 220 may extract the fingerprint of the original video according to the method for extracting the fingerprint of the video.

The processor 220 may extract the fingerprint of the video being identified, at S1120. The processor 220 may extract the fingerprint of the video being identified according to the method for extracting the fingerprint of the video according to various examples, and may extract the fingerprint of the video being identified according to the same method that is employed to extract the fingerprint of the original video.

The processor 220 may determine whether or not the video being identified is a tampered video, by comparing the obtained fingerprint of the original video with the fingerprint of the extracted video being identified, at S1130. A video being identified that is identical to the original video may be determined to be the tampered video of the original video. The processor 220 may determine whether or not tampering is present, by inputting the fingerprint of the original video and the fingerprint of the video being identified to the matching algorithm. If at least a portion of the fingerprint of the video being identified is the same as, similar to, or within an error range of at least a portion of the fingerprint of the original video, the matching algorithm may determine that the video being identified is the tampered video of the original video.

The flowcharts illustrated in FIGS. 10 and 11 are merely examples, and may be implemented differently. For example, operations may be added or omitted, or the order of the operations may be changed, or certain operations may be repeatedly performed.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for extracting a fingerprint of a video being identified, the method being executed by one or more processors and comprising:
    calculating a 2D discrete cosine transform (DCT) coefficient from each of a plurality of frames of the video;
    extracting, from the 2D DCT coefficients, a coefficient having a basis satisfying at least one of up-down symmetry or left-right symmetry; and
    calculating a fingerprint of the video based on the extracted coefficient.

2. The method according to claim 1, wherein the calculating of the 2D DCT coefficient includes:
    obtaining a plurality of pixel value matrices from each of the plurality of frames; and
    calculating the 2D DCT coefficients from each of the plurality of pixel value matrices.

3. The method according to claim 1, wherein the calculating of the 2D DCT coefficient includes:
    calculating the 2D DCT coefficients from each of the plurality of frames; and
    selecting, from the 2D DCT coefficients, a plurality of low-band coefficients having a horizontal frequency of a basis equal to or less than a first predefined frequency, and a vertical frequency of a basis equal to or less than a second predefined frequency.

4. The method according to claim 1, wherein the extracting of the coefficient having the basis satisfying at least one of up-down symmetry or left-right symmetry includes:
    selecting, from the 2D DCT coefficients, a plurality of low-band coefficients having a horizontal frequency of a basis equal to or less than a first predefined frequency, and a vertical frequency of a basis equal to or less than a second predefined frequency; and
    extracting, from the plurality of low-band coefficients, a plurality of coefficients having a basis satisfying up-down symmetry or left-right symmetry.

5. The method according to claim 1, wherein the extracting of the coefficient having the basis satisfying at least one of up-down symmetry or left-right symmetry includes:
    selecting, from the 2D DCT coefficients, a plurality of low-band coefficients having a horizontal frequency of a basis equal to or less than a first predefined frequency, and a vertical frequency of a basis equal to or less than a second predefined frequency; and
    extracting, from the plurality of low-band coefficients, a plurality of coefficients having a basis satisfying up-down symmetry and left-right symmetry.

6. The method according to claim 1, wherein the extracting of the coefficient having the basis satisfying at least one of up-down symmetry or left-right symmetry includes excluding, from the 2D DCT coefficients, a coefficient having both a horizontal frequency of a basis and a vertical frequency of a basis of 0.

7. The method according to claim 1, wherein the calculating of the fingerprint of the video includes calculating, from the extracted coefficients, a mean of variances of the extracted coefficients according to temporal change in the plurality of frames.

8. The method according to claim 7, wherein the calculating of the mean of variances of the extracted coefficients includes:
    calculating a variance between adjacent frames of coefficients having the same basis among the extracted coefficients; and
    calculating a mean of the calculated variances for each basis.

9. The method according to claim 1, further comprising:
    obtaining a fingerprint of an original video; and
    determining whether or not the video being identified is a tampered video, by comparing the obtained fingerprint of the original video with the extracted fingerprint of the video being identified.

10. A non-transitory computer-readable recording medium storing instructions that, when executed by one or more processors, cause performance of the method according to claim 1.

11. A computing device, comprising:
    a memory; and
    one or more processors connected to the memory and configured to execute one or more computer-readable programs included in the memory for extracting a fingerprint of a video being identified, wherein
    the one or more programs include instructions for:
    calculating 2D DCT coefficients from each of a plurality of frames included in the video;
    extracting, from the 2D DCT coefficients, a coefficient having a basis satisfying at least one of up-down symmetry or left-right symmetry; and
    calculating a fingerprint of the video based on the extracted coefficient.

12. The computing device according to claim 11, wherein the calculating of the 2D DCT coefficients includes:
    obtaining a plurality of pixel value matrices from each of the plurality of frames; and
    calculating the 2D DCT coefficients from each of the plurality of pixel value matrices.

13. The computing device according to claim 11, wherein the calculating of the 2D DCT coefficients includes:
    calculating the 2D DCT coefficients from each of the plurality of frames; and
    selecting, from the 2D DCT coefficients, a plurality of low-band coefficients having a horizontal frequency of a basis equal to or less than a first predefined frequency, and a vertical frequency of a basis equal to or less than a second predefined frequency.

14. The computing device according to claim 11, wherein the extracting of the coefficient having the basis satisfying at least one of up-down symmetry or left-right symmetry includes:
    selecting, from the 2D DCT coefficients, a plurality of low-band coefficients having a horizontal frequency of a basis equal to or less than a first predefined frequency, and a vertical frequency of a basis equal to or less than a second predefined frequency; and
    extracting, from the plurality of low-band coefficients, a plurality of coefficients having a basis satisfying up-down symmetry or left-right symmetry.

15. The computing device according to claim 11, wherein the extracting of the coefficient having the basis satisfying at least one of up-down symmetry or left-right symmetry includes:
 selecting, from the 2D DCT coefficients, a plurality of low-band coefficients having a horizontal frequency of a basis equal to or less than a first predefined frequency, and a vertical frequency of a basis equal to or less than a second predefined frequency; and
 extracting, from the plurality of low-band coefficients, a plurality of coefficients having a basis satisfying up-down symmetry and left-right symmetry.

16. The computing device according to claim 11, wherein the extracting of the coefficient having the basis satisfying at least one of up-down symmetry or left-right symmetry includes excluding, from the 2D DCT coefficients, a coefficient having both a horizontal frequency of a basis and a vertical frequency of a basis of 0.

17. The computing device according to claim 11, wherein the calculating of the fingerprint of the video includes calculating, from the extracted coefficients, a mean of variances of the extracted coefficients according to temporal change in the plurality of frames.

18. The computing device according to claim 17, wherein the calculating of the mean of variances of the extracted coefficients includes:
 calculating a variance between adjacent frames of coefficients having the same basis among the extracted coefficients; and
 calculating a mean of the calculated variances for each basis.

19. The computing device according to claim 11, wherein the at least one program further includes instructions for:
 obtaining a fingerprint of an original video; and
 determining whether or not the video being identified is a tampered video, by comparing the obtained fingerprint of the original video with the extracted fingerprint of the video being identified.

* * * * *